(12) United States Patent
Minamisawa et al.

(10) Patent No.: US 10,598,953 B2
(45) Date of Patent: Mar. 24, 2020

(54) OPTICAL UNIT WITH SHAKE CORRECTION FUNCTION AND HAVING A ROLLING SUPPORT MECHANISM

(71) Applicant: NIDEC SANKYO CORPORATION, Suwa-gun, Nagano (JP)

(72) Inventors: Shinji Minamisawa, Nagano (JP); Takeshi Sue, Nagano (JP)

(73) Assignee: NIDEC SANKYO CORPORATION, Nagano (JP)

( * ) Notice: Subject to any disclaimer, the term of this patent is extended or adjusted under 35 U.S.C. 154(b) by 122 days.

(21) Appl. No.: 15/809,135

(22) Filed: Nov. 10, 2017

(65) Prior Publication Data

US 2018/0129066 A1 May 10, 2018

(30) Foreign Application Priority Data

Nov. 10, 2016 (JP) ................................. 2016-219848

(51) Int. Cl.
*G02B 27/64* (2006.01)
*G02B 7/02* (2006.01)
*H02K 33/12* (2006.01)
*G02B 7/08* (2006.01)

(52) U.S. Cl.
CPC ........... *G02B 27/646* (2013.01); *G02B 7/021* (2013.01); *H02K 33/12* (2013.01); *G02B 7/08* (2013.01)

(58) Field of Classification Search
CPC .. G02B 27/64; G02B 27/646; H04N 5/23248; H04N 5/23264; H04N 5/2328; H04N 5/23287

USPC ....... 359/554, 557; 250/201.1, 201.2, 201.4; 348/208.99, 208.2, 208.12; 396/52, 55
See application file for complete search history.

(56) References Cited

U.S. PATENT DOCUMENTS

| 9,720,252 | B2* | 8/2017 | Asakawa | G02B 27/646 |
| 2018/0284476 | A1* | 10/2018 | Minamisawa | G02B 7/021 |
| 2018/0284477 | A1* | 10/2018 | Minamisawa | G02B 27/646 |
| 2018/0284566 | A1* | 10/2018 | Minamisawa | G03B 5/00 |
| 2018/0284567 | A1* | 10/2018 | Minamisawa | G03B 5/00 |
| 2018/0284569 | A1* | 10/2018 | Minamisawa | G03B 5/06 |
| 2018/0284570 | A1* | 10/2018 | Minamisawa | G03B 5/06 |

FOREIGN PATENT DOCUMENTS

JP 2015082072 A 4/2015

* cited by examiner

*Primary Examiner* — Arnel C Lavarias
(74) *Attorney, Agent, or Firm* — Cantor Colburn LLP

(57) ABSTRACT

An optical unit includes a subject-side rotary bearing part located on a subject side of an optical module and an image-side rotary bearing part located on an image side of the optical module. The two rotary bearing parts disposed on both the subject side and the image side of the optical module make it possible to restrain the tilt of the optical module and restrain backlash during a rotation of the optical module around an optical axis. This prevents the optical module from becoming a cantilever state and a twisting load from being applied due to an impact. Thus, it is possible to reduce the possibility of breakage of the rotary bearing parts due to an impact. A movable body includes a rotary bearing holder which swingably supports the optical module. A rolling magnetic-drive mechanism is disposed between the rotary bearing holder and a fixed body.

20 Claims, 8 Drawing Sheets

(a)

OPTICAL UNIT WITH SHAKE CORRECTION FUNCTION AND HAVING A ROLLING SUPPORT MECHANISM

CROSS REFERENCE TO RELATED APPLICATION

The present invention claims priority under 35 U.S.C § 119 to Japanese Application No. 2016-219848, filed Nov. 10, 2016, the entire content of which is incorporated herein by reference.

FIELD OF THE INVENTION

At least an embodiment of the present invention may relate to an optical unit that rotates an optical module provided with an optical element around an optical axis to perform rolling correction.

BACKGROUND

Some of optical units mounted on portable terminals or mobile units have a mechanism that swings or rotates an optical element to correct a shake in order to restrain disturbance of a photographed image on the move of the portable terminals or the mobile units. For example, an optical unit disclosed in Japanese Patent Laid-Open No. 2015-082072 includes a swing mechanism (swinging magnetic-drive mechanism) that swings an optical module provided with an optical element in a pitching direction and a yawing direction responding to shakes in the two directions of pitching (vertical shake/tilting) and yawing (horizontal shake/panning). Further, the optical unit also includes a rolling correction mechanism (rolling magnetic-drive mechanism) that rotates a movable body provided with the optical module and the swinging magnetic-drive mechanism around an optical axis responding to the rotation of the optical element around the optical axis.

In the optical unit of Japanese Patent Laid-Open No. 2015-082072, a rotary bearing, such as a ball bearing, is used as a support mechanism for rotatably supporting the optical module around the optical axis. The rotary bearing is disposed on an end part on one side (image side) in the optical axis direction of the optical module. When the optical module is supported by a cantilever structure in this manner, the optical module may be tilted. Further, backlash may not be prevented when the optical module rotates in the rolling direction. For example, when a ball bearing is used as the rotary bearing, a sufficient pressure cannot be applied, which may result in backlash of balls between an inner ring and an outer ring of the ball bearing. Accordingly, the backlash of the optical module may not be prevented. Further, there is also another problem in that the ball bearing is easy to break by a drop impact.

Further, FIG. 11 of Japanese Patent Laid-Open No. 2015-082072 illustrates a support structure that includes an elastic pivot part disposed on an end part on one side (image side) in the optical axis direction of the optical module and a ball bearing disposed on an end part on the other side (subject side) in the optical axis direction. Although such a support structure is not a cantilever structure, the optical module may be tilted around the pivot part. Thus, the backlash of the optical module may not be prevented.

SUMMARY

In view of the circumstances described above, at least an embodiment of the present invention may advantageously provide an optical unit that rotates an optical module provided with an optical element around an optical axis to perform rolling correction, thereby reducing backlash during rotation of the optical module that rotates around the optical axis and reducing the possibility of breakage due to an impact.

In order to attain the objective, at least an embodiment of the present invention provides an optical unit including an optical module including an optical element, a swinging magnetic-drive mechanism that swings the optical module around an axis intersecting an optical axis, a rolling support mechanism that rotatably supports the optical module around the optical axis, a fixed body that supports the rolling support mechanism, and a rolling magnetic-drive mechanism that rotates the optical module around the optical axis. The rolling support mechanism includes a subject-side rotary bearing part disposed on a subject side of the optical module and an image-side rotary bearing part disposed on an image side of the optical module.

According to at least an embodiment of the present invention, the optical module is supported by the subject-side rotary bearing part and the image-side rotary bearing part. It is possible to restrain the tilt of the optical module and restrain backlash during the rotation of the optical module around the optical axis by disposing the two rotary bearing parts on both the subject side and the image side of the optical module in this manner. When only one rotary bearing part is provided, the optical module becomes a cantilever state. Accordingly, a twisting load is applied to the rotary bearing part due to an impact. The rotary bearing part is weak against such a load and may thus be broken due to the impact. In an embodiment of the present invention, the two rotary bearing parts support the optical module, which prevents the optical module from becoming a cantilever state. Thus, there is no force in a twisting direction. Therefore, it is possible to reduce the possibility of breakage of the rotary bearing parts due to an impact.

In at least an embodiment of the present invention, it is desirable that the optical unit further includes a rotary bearing holder that swingably supports the optical module through the swinging magnetic-drive mechanism. It is also desirable that the subject-side rotary bearing part and the image-side rotary bearing part are fixed to the rotary bearing holder. It is also desirable that either a magnet or a coil, the magnet and the coil being included in the rolling magnetic-drive mechanism, is fixed to the rotary bearing holder, and the other one is fixed to the fixed body. With this structure, the optical module swings with respect to the rotary bearing holder, and the rotary bearing holder rolls with respect to the fixed body. Thus, even when the optical module swings, there is no change in the relative position between the rotary bearing holder and the fixed body. Therefore, it is possible to reduce a change in a drive force of the rolling magnetic-drive mechanism.

In at least an embodiment of the present invention, it is desirable that the magnet is fixed to the fixed body, and the coil is fixed to the rotary bearing holder. The weight of a movable body which rotates around the optical axis can be reduced by fixing the lightweight coil to the member (rotary bearing holder) included in the movable body in this manner. As a result, it is possible to downsize the rolling magnetic-drive mechanism.

In at least an embodiment of the present invention, it is desirable that the rotary bearing holder includes a holder body part including an image-side opening open on the image side of the optical module and a bottom plate fixed to the image-side opening. It is also desirable that a shaft rotatably supported by the image-side rotary bearing part is disposed on the bottom plate. It is also desirable that the fixed body includes a case that biases the image-side rotary bearing part toward the bottom plate. Further, in this case, it is desirable that the image-side rotary bearing part is a ball bearing including an outer ring biased toward the bottom plate by the case and an inner ring fixed with the shaft. With this structure, the bottom plate and the image-side rotary bearing part can be attached from the image side (imaging element side) of the optical module assembled to the rotary bearing holder. This results in an easy assembling operation of the image-side rotary bearing part. Further, when a ball bearing is used as the image-side rotary bearing part, it is possible to apply a pressure to the ball bearing by biasing the outer ring toward the bottom plate by the case included in the fixed body. Accordingly, gaps between balls of the ball bearing and the inner ring and between the balls and the outer ring can be eliminated. Thus, it is possible to reduce backlash during rotation.

In at least an embodiment of the present invention, it is desirable that the swinging magnetic-drive mechanism includes a first magnetic-drive mechanism disposed on one side or each side in a first direction intersecting the optical axis with respect to the optical module and a second magnetic-drive mechanism disposed on one side or each side in a second direction intersecting the optical axis and the first direction with respect to the optical module. It is also desirable that the rolling magnetic-drive mechanism is disposed on one side or each side in a third direction between the first direction and the second direction with respect to the optical module. With this structure, the rolling support mechanism can be disposed using a space between the first magnetic-drive mechanism and the second magnetic-drive mechanism. Therefore, it is possible to downsize the optical unit.

In at least an embodiment of the present invention, it is desirable that the subject-side rotary bearing part is a ball bearing including an inner ring fixed to the rotary bearing holder and an outer ring fixed to the fixed body. It is also desirable that the rotary bearing holder holds a swing support mechanism that swingably supports the optical module. This structure enables the rotary bearing holder to have both a holding mechanism for holding the ball bearing and a holding mechanism for holding a gimbal mechanism. Thus, it is possible to simplify the structure of the optical unit and reduce the number of components.

In at least an embodiment of the present invention, it is desirable that the swing support mechanism is a gimbal mechanism. It is also desirable that the gimbal mechanism includes a first swing support part disposed on the optical module, a second swing support part disposed on the rotary bearing holder, and a movable frame supported by the first swing support part and the second support part. It is also desirable that the first swing support part and the second swing support part are disposed between angles of the first direction and the second direction. With this structure, the swing support parts of the gimbal mechanism can be disposed using free spaces in the first direction and the second direction. Thus, the swing support mechanism can be disposed using the free spaces in the first direction and the second direction. As a result, it is possible to downsize the optical unit.

In at least an embodiment of the present invention, the magnet and the coil included in the rolling magnetic-drive mechanism may face each other in the optical axis direction. With this structure, for example, the rolling magnetic-drive mechanism can be disposed using a free space around the image-side rotary bearing part. Thus, it is possible to downsize the optical unit.

In this case, it is desirable that the coil includes two effective sides extending in a radial direction around the optical axis at positions separated from each other in a circumferential direction. It is also desirable that a magnetized polarization line of the magnet is located between the two effective sides. With this structure, it is possible to reduce the generation of a drive force that is unnecessary for the rotation around the optical axis. Thus, an ineffective drive force can be reduced.

In at least an embodiment of the present invention, it is desirable that the rotary bearing holder includes a protrusion formed on an outer peripheral face thereof. It is also desirable that the fixed body includes a restriction part that restricts a movement range in the circumferential direction of the protrusion. With this structure, the rotary bearing holder and the fixed body can constitute a stopper mechanism for restricting a rotation range in the rolling direction of the optical module and the rotary bearing holder.

In at least an embodiment of the present invention, it is desirable that a coil included in the swinging magnetic-drive mechanism is fixed to the optical module. With this structure, components to which current is supplied can be integrated to the optical module, so that wiring lines for current supply can be integrated. Note that coil integration into one component can also be achieved by using, for example, a printed coil.

In at least an embodiment of the present invention, it is desirable that the optical module includes a lens barrel that holds the optical element. It is also desirable that the subject-side rotary bearing part is located on an outer peripheral side of an end part of the lens barrel, the lens barrel being located on the subject side relative to the swinging magnetic-drive mechanism. With this structure, the end part of the lens barrel which protrudes to the subject side is protected by the subject-side rotary bearing part.

In at least an embodiment of the present invention, it is desirable that the optical unit includes a magnetic sensor located at a position facing a magnetized polarization line of a magnet included in the rolling magnetic-drive mechanism. It is also desirable that the rolling magnetic-drive mechanism is controlled on the basis of an original position in a rolling direction detected on the basis of an output of the magnetic sensor. With this structure, a spring for a return to the original position is not required. Further, differently from a configuration that performs the return to the original position using a spring, it is possible to eliminate a swing return during the return to the original position. Further, it is also possible to control the rolling magnetic-drive mechanism by detecting a drive direction.

According to at least an embodiment of the present invention, the optical module is rotatably supported by the subject-side rotary bearing part and the image-side rotary bearing part. It is possible to restrain the tilt of the optical module and restrain backlash during the rotation of the optical module around the optical axis by disposing the two rotary bearing parts on both the subject side and the image side of the optical module in this manner. Further, it is possible to prevent the optical module from becoming a cantilever state and a twisting load from being applied due to an impact. Thus, it is possible to reduce the possibility of breakage of the rotary bearing parts due to an impact.

Other features and advantages of the invention will be apparent from the following detailed description, taken in conjunction with the accompanying drawings that illustrate, by way of example, various features of embodiments of the invention.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which.

DETAILED DESCRIPTION (Entire Structure)

An optical unit 1 provided with an optical module to which an embodiment of the present invention is applied will be described below with reference to the accompanying drawings. In the following description, three directions perpendicular to each other are set to be an "X"-axis direction, a "Y"-axis direction, and a "Z"-axis direction. Further, "+X" is indicated on one side in the "X"-axis direction, "−X" is indicated on the other side, "+Y" is indicated on one side in the "Y"-axis direction, "−Y" is indicated on the other side, "+Z" is indicated on one side in the "Z"-axis direction, and "−Z" is indicated on the other side. The "Z"-axis direction coincides with an optical axis direction "L" of the optical module. Further, the side "−Z" in the "Z"-axis direction corresponds to an image side in the optical axis direction "L" and the side "+Z" in the "Z"-axis direction corresponds to a subject side in the optical axis direction "L". In the following description, the "X"-axis direction is defined as a first direction, and the "Y"-axis direction is defined as a second direction. Further, a direction between the "X"-axis direction and the "Y"-axis direction is defined as a third direction. For example, the third direction is inclined by 45° relative to the "X"-axis direction and the "Y"-axis direction.

Figure 1:
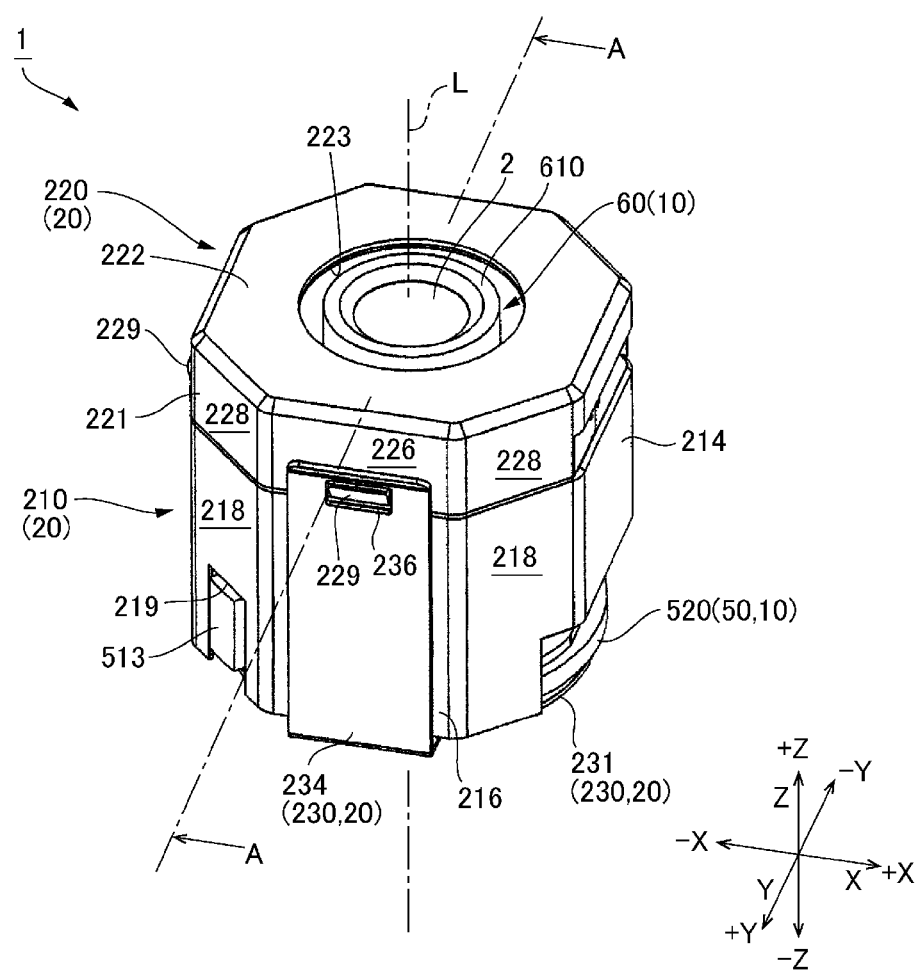
FIG. 1 is a perspective view of an optical unit to which at least an embodiment of the present invention is applied and which is viewed from a subject side.
Figure 2:
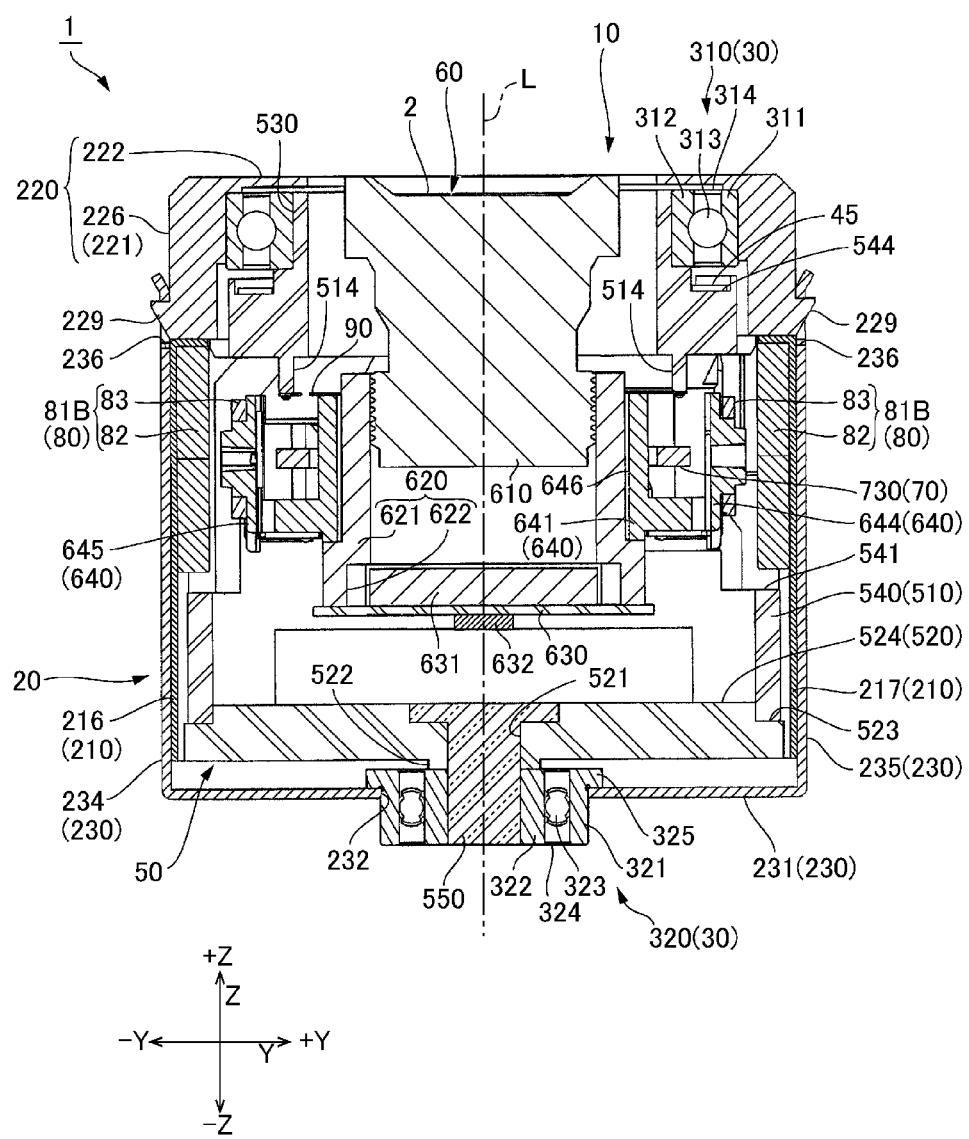
FIG. 2 is a sectional view of the optical unit of FIG. 1.
Figure 3:
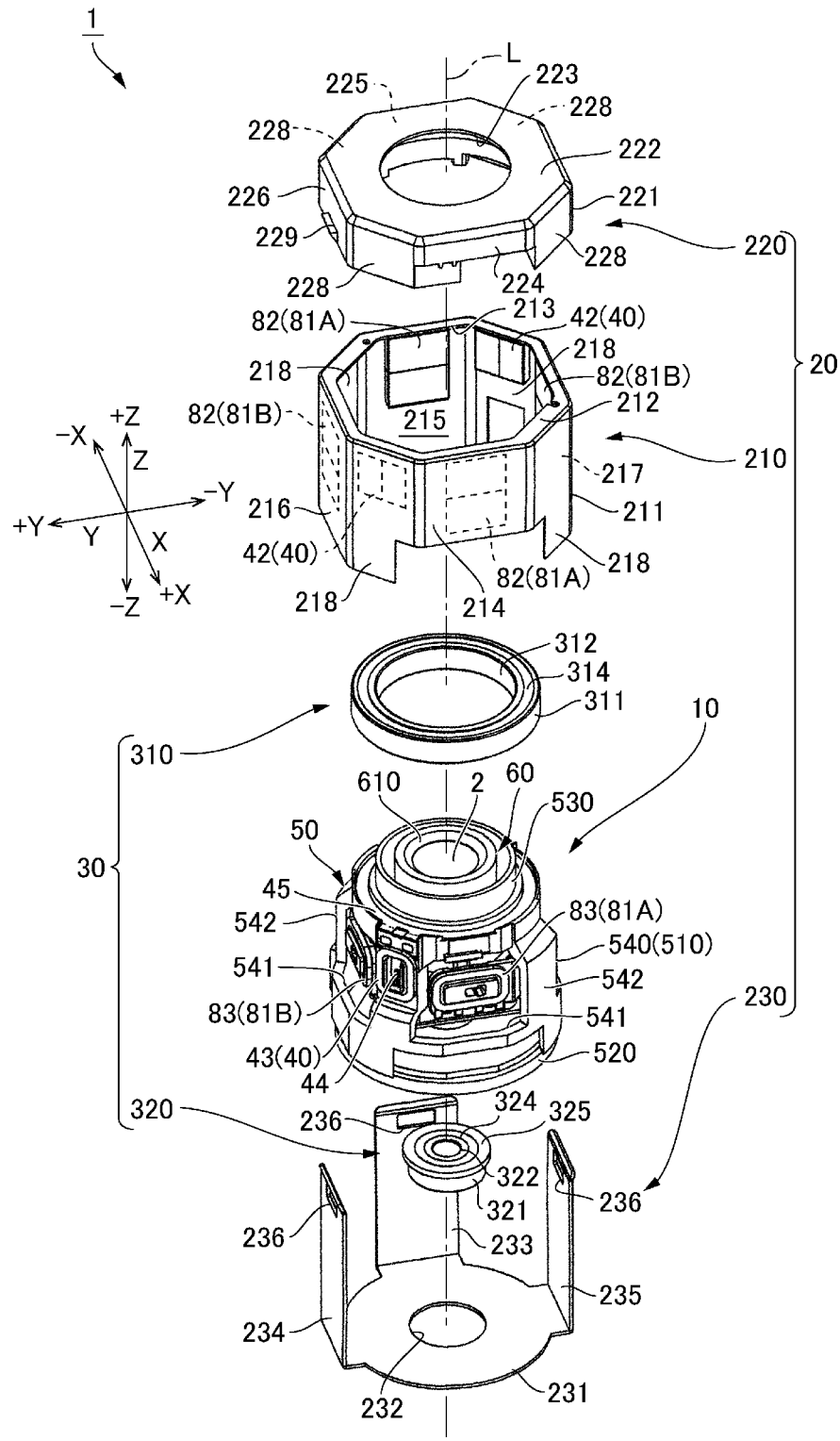
FIG. 3 is an exploded perspective view of the optical unit of FIG. 1 which is viewed from the subject side.
Figure 4:
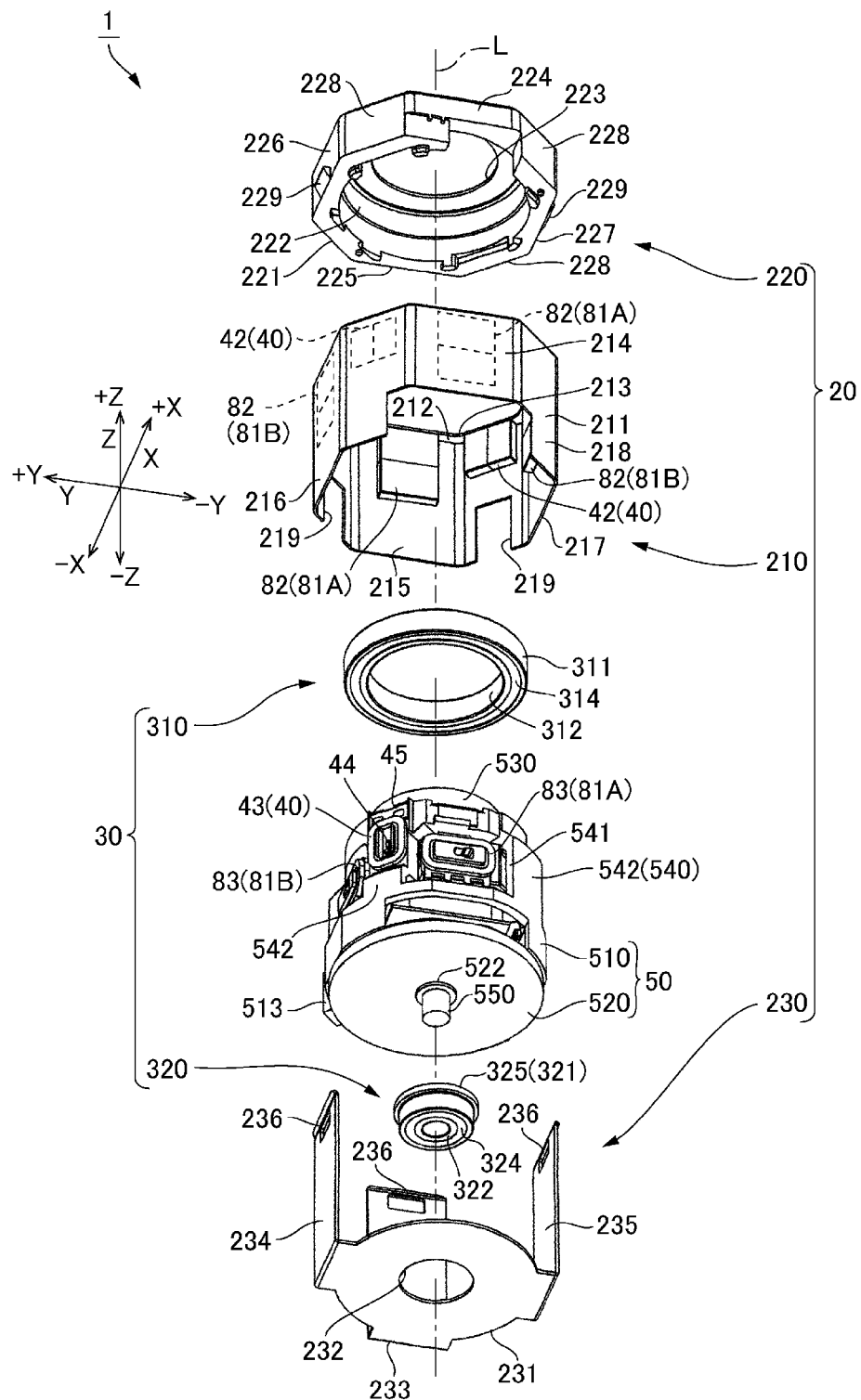
FIG. 4 is an exploded perspective view of the optical unit of FIG. 1 which is viewed from an image side.

FIG. 1 is a perspective view of the optical unit 1 to which an embodiment of the present invention is applied and which is viewed from the subject side. FIG. 2 is a sectional view of the optical unit 1 of FIG. 1 (taken along line A-A of FIG. 1). FIG. 3 is an exploded perspective view of the optical unit 1 of FIG. 1 which is viewed from the subject side. FIG. 4 is an exploded perspective view of the optical unit 1 of FIG. 1 which is viewed from the image side. The optical unit 1 is used in, for example, a cell phone with a camera, an optical device such as a drive recorder, and an optical device such as an action camera or a wearable camera mounted on a helmet, a bicycle, a mobile unit such as a radio-controlled helicopter, or the like. In such an optical device, when a shake of the optical device occurs at the time of photographing, disturbance of a photographed image occurs. The optical unit 1 corrects a tilt of an optical element 2 to avoid a tilt of a photographed image.

The optical unit 1 includes a movable body 10, a fixed body 20, a rolling support mechanism 30 which rotatably supports the movable body 10 around the optical axis with respect to the fixed body 20, and a rolling magnetic-drive mechanism 40 which rotates the movable body 10 around the optical axis. The movable body 10 includes a rotary bearing holder 50 which is rotatably supported by the rolling support mechanism 30, an optical module 60 which includes the optical element 2, a gimbal mechanism 70 which swingably supports the optical module 60 with respect to the rotary bearing holder 50, a swinging magnetic-drive mechanism 80 which swings the optical module 60, and a spring member 90 which connects the optical module 60 and the rotary bearing holder 50 to each other.

(Fixed Body)

The fixed body 20 includes a plurality of cases which are assembled together. Specifically, the fixed body 20 includes a tubular case 210 which has a substantially octagonal outer shape when viewed in the optical axis direction "L" ("Z"-axis direction), a front case 220 which is assembled to the tubular case 210 from the subject side (the side "+Z" in the "Z"-axis direction), and a rear case 230 which is assembled to the tubular case 210 from the image side (the side "−Z" in the "Z"-axis direction). The tubular case 210 includes a body part 211 which has a substantially octagonal tubular shape and an end plate part 212 which has a frame shape and protrudes to the inner side from an end part on the side "+Z" in the "Z"-axis direction of the body part 211. An opening 213 which has a substantially octagonal shape is formed on the center of the end plate part 212. The body part 211 includes side plates 214, 215 which face each other in the "X"-axis direction, side plates 216, 217 which face each other in the "Y"-axis direction, and side plates 218 which are formed on four corners inclined by 45° relative to the "X"-axis direction and the "Y"-axis direction. Cut-out parts 219 each of which has a rectangular shape are formed on respective two of the four side plates 218. Each of the cut-out parts 219 is formed by cutting an edge on the side "−Z" in the "Z"-axis direction of the side plate 218 toward the side "+Z" in the "Z"-axis direction. As described below, the cut-out parts 219 function as a restriction part which restricts a rotation range of the movable body 10 around the optical axis.

The front case 220 includes a body part 221 which comes into contact with the end plate part 212 of the tubular case 210 and an end plate part 222 which protrudes to the inner side from an end part on the side "+Z" in the "Z"-axis direction of the body part 221. A circular opening 223 is formed on the center of the end plate part 222. An inner peripheral face of the body part 221 has a substantially circular shape, and an outer peripheral face of the body part 221 has a substantially octagonal shape when viewed in the optical axis direction "L". The outer peripheral face of the body part 221 includes side faces 224, 225 which face each other in the "X"-axis direction, side faces 226, 227 which face each other in the "Y"-axis direction, and side faces 228 which are formed on four corners inclined by 45° relative to the "X"-axis direction and the "Y"-axis direction. Engagement projections 229 are formed on respective three of the four side faces 224 to 227 (the side faces 225, 226, 227 which respectively face the side "−X" in the "X"-axis direction, the side "+Y" in the "Y"-axis direction, and the side "−Y" in the "Y"-axis direction).

The rear case 230 includes an end plate part 231 which is formed in a circular shape and perpendicular to the optical axis direction "L". A circular opening 232 is formed on the center of the end plate part 231. The rear case 230 also includes engagement plates 233, 234, 235 each of which protrudes to the outer side in the radial direction from the outer peripheral edge of the end plate part 231, and bends and extends toward the side "+Z" in the "Z"-axis direction. The engagement plates 233, 234, 235 are formed at angular positions where the engagement projections 229 of the front case 220 are formed (the side "−X" in the "X"-axis direction, the side "+Y" in the "Y"-axis direction, and the side "−Y" in the "Y"-axis direction). Engagement holes 236 are formed on tips of the respective engagement plates 233, 234, 235. As illustrated in FIG. 1, when the rear case 230 is assembled to the tubular case 210 from the side "−Z" in the "Z"-axis direction, the engagement projections 229 of the front case 220 assembled to an end part on the side "+Z" in the "Z"-axis direction of the tubular case 210 are engaged with the respective engagement holes 236. Accordingly, the tubular case 210, the front case 220, and the rear case 230 are integrally assembled.

(Rolling Support Mechanism)

The rolling support mechanism 30 includes a subject-side rotary bearing part 310 which rotatably supports an end part on the subject side (the side "+Z" in the "Z"-axis direction) of the movable body 10 and an image-side rotary bearing part 320 which rotatably supports an end part on the image side (the side "−Z" in the "Z"-axis direction) of the movable body 10. In this embodiment, the subject-side rotary bearing part 310 is a ball bearing. The subject-side rotary bearing part 310 includes an outer ring 311 which is fixed to the circular inner peripheral face formed on the inner side of the front case 220, an inner ring 312 which is fixed to the movable body 10, and a plurality of balls 313 which are rollably held between the outer ring 311 and the inner ring 312. Further, seal plates 314 which cover a space in which the balls 313 are disposed are attached between the inner ring 312 and the outer ring 311. The seal plates 314 are disposed on the side "+Z" and the side "−Z" in the "Z"-axis direction of the balls 313.

The image-side rotary bearing part 320 is a ball bearing and rotatably supports a shaft 550 which protrudes to the side "−Z" in the "Z"-axis direction from the end part on the image side (the side "−Z" in the "Z"-axis direction) of the movable body 10. The image-side rotary bearing part 320 includes an outer ring 321 which is fixed to the circular opening 232 formed on the end plate part 231 of the rear case 230, an inner ring 322 which is fixed to the shaft 550, and a plurality of balls 323 which are rollably held between the outer ring 321 and the inner ring 322. Further, seal plates 324 which cover a space in which the balls 323 are disposed are attached between the inner ring 322 and the outer ring 321. The seal plates 324 are disposed on the side "+Z" and the side "−Z" in the "Z"-axis direction of the balls 323.

A flange 325 is formed on an end part on the side "+Z" in the "Z"-axis direction of the outer ring 321 of the image-side rotary bearing part 320. The flange 325 is engaged with an inner peripheral edge of the circular opening 232 which is formed on the end plate part 231 of the rear case 230 and biased to the side "+Z" in the "Z"-axis direction by the end plate part 231. A pressure is applied to the image-side rotary bearing part 320 by biasing the outer ring 321 to the side "+Z" in the "Z"-axis direction through the flange 325. As described above, the rear case 230 includes the engagement plates 233, 234, 235 which are connected to the end plate part 231, and the engagement holes 236 formed on the engagement plates 233, 234, 235 are engaged with the respective engagement projections 229 of the front case 220. Thus, the rear case provided with the end plate part 231 functions as a plate spring that biases the flange 325 to the side "+Z" in the "Z"-axis direction.

(Rotary Bearing Holder)

Figure 5A:
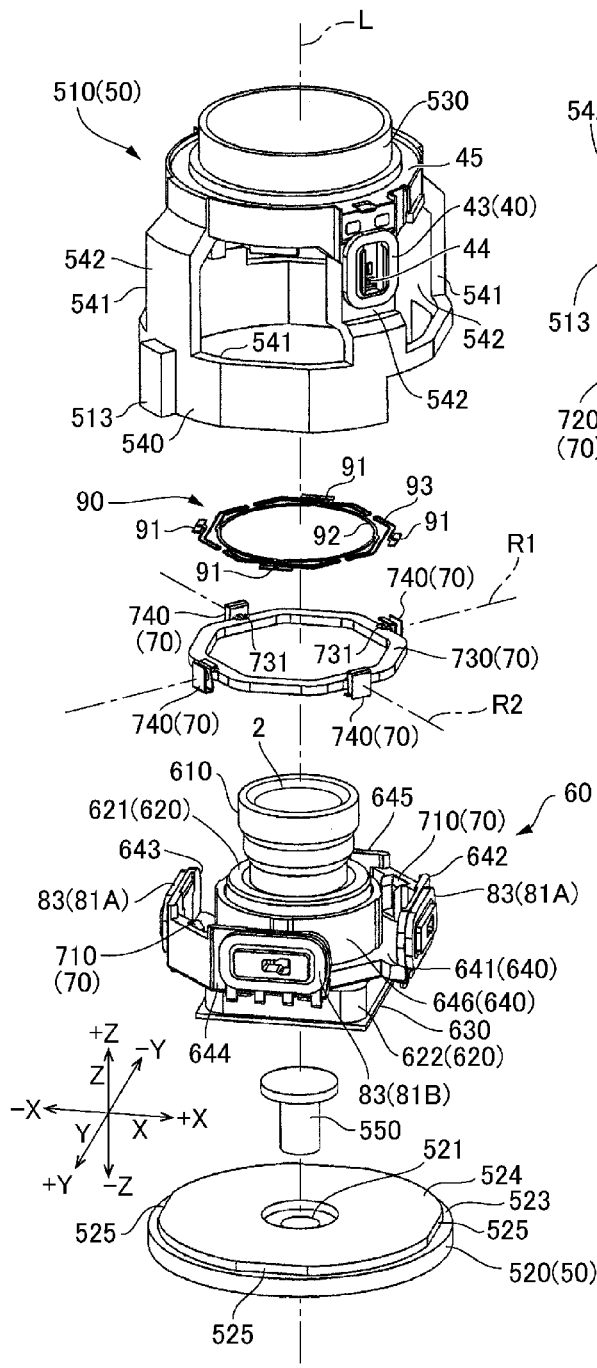
FIG. 5A is an exploded perspective view of a movable body which is viewed from the subject side.
Figure 5B:
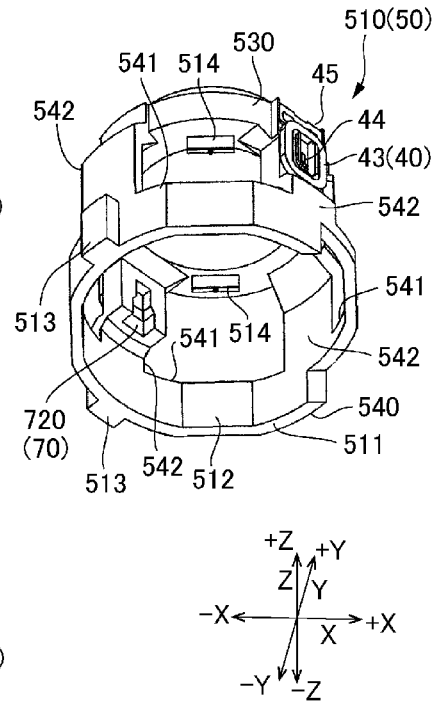
FIG. 5B is a perspective view of a rotary bearing holder which is viewed from the image side.

FIG. 5A is an exploded perspective view of the movable body 10 which is viewed from the subject side (the side "+Z" in the "Z"-axis direction). FIG. 5B is a perspective view of the rotary bearing holder 50 which is viewed from the image side (the side "−Z" in the "Z"-axis direction). The rotary bearing holder 50 includes a holder body part 510 to which the inner ring 312 of the subject-side rotary bearing part 310 is fixed and a bottom plate 520 which is formed in a substantially circular shape and fixed to an image-side opening 511 which is formed on an end part on the side "−Z" in the "Z"-axis direction of the holder body part 510. A through hole 521 is formed on the center of the bottom plate 520. The shaft 550 is fixed to the through hole 521. The shaft 550 protrudes to the side "−Z" in the "Z"-axis direction through the through hole 521. As illustrated in FIGS. 2 and 4, the bottom plate 520 includes an annular protrusion 522 which protrudes to the side "−Z" in the "Z"-axis direction along an edge of the through hole 521. As illustrated in FIG. 2, the inner ring 322 of the image-side rotary bearing part 320 fixed to the shaft 550 is brought into contact with the annular protrusion 522 from the side "−Z" in the "Z"-axis direction and thereby positioned.

A step 523 is formed on an outer peripheral edge of the bottom plate 520. An annular protrusion 524 which protrudes to the side "+Z" in the "Z"-axis direction is formed on an inner peripheral side of the step 523. The annular protrusion 524 is fitted with the inner side of the image-side opening 511 of the holder body part 510. Plane parts 525 are formed on an outer peripheral face of the annular protrusion 524. Each of the plane parts 525 is formed by cutting the outer peripheral face of the annular protrusion 524 in a direction perpendicular to the radial direction. Plane parts 512 which are fitted with the respective plane parts 525 are formed on an inner peripheral face of the image-side opening 511 (refer to FIG. 5B). Thus, the bottom plate 520 is relatively unrotatably assembled to the holder body part 510, and the shaft 550 fixed to the bottom plate 520 rotates integrally with the holder body part 510.

The holder body part 510 includes a bearing fixing part 530 which is formed in an annular shape and formed on an end part on the subject side (the side "+Z" in the "Z"-axis direction) thereof and a holder body part 540 which is formed on the side "−Z" in the "Z"-axis direction of the bearing fixing part 530. The holder body part 540 includes window parts 541 which are formed at a plurality of angular positions around the optical axis and vertical frame parts 542 each of which partitions between the window parts 541 that are adjacent to each other in the circumferential direction. In this embodiment, four vertical frame parts 542 are formed at regular angular intervals. Coil fixing parts 543 are formed on respective two of the four vertical frame parts 542 which are separated from each other by 180° around the optical axis. Each of the vertical frame parts 542 is disposed at an angular position (the third direction) between the "X"-axis direction (the first direction) and the "Y"-axis direction (the second direction). Accordingly, each of the coil fixing parts 543 is disposed at the angular position (the third direction) between the "X"-axis direction (the first direction) and the "Y"-axis direction (the second direction).

(Optical Module)

The optical module 60 is disposed on the inner side of the rotary bearing holder 50. The optical module 60 includes the optical element 2, a lens barrel 610 which holds the optical element 2, a lens barrel support member 620 which holds the lens barrel 610, a substrate 630 on which an image sensor 631, a gyroscope 632, a signal processing circuit and the like are mounted, and a lens barrel holder 640. The lens barrel support member 620 includes a cylindrical part 621 and a sensor housing part 622 which is formed on an end part on the side "−Z" in the "Z"-axis direction of the cylindrical part 621. The substrate 630 is fixed to the sensor housing part 622. An end part on the side "−Z" in the "Z"-axis direction of the lens barrel 610 is inserted into the cylindrical part 621 of the lens barrel support member 620. A threaded part is formed on the end part on the side "−Z" in the "Z"-axis direction of the lens barrel 610. Further, a threaded part is formed on an inner peripheral face of the cylindrical part 621.

The lens barrel 610 which holds the optical element 2 and the lens barrel support member 620 are held by the lens barrel holder 640. As illustrated in FIGS. 2 and 3, the lens barrel holder 640 includes a lens barrel holder body part 641 which has a substantially octagonal shape when viewed in the optical axis direction, a pair of wall parts 642, 643 which extend in the "Y"-axis direction on opposite ends in the "X"-axis direction of the lens barrel holder body part 641, and a pair of wall parts 644, 645 which extend in the "X"-axis direction on opposite ends in the "Y"-axis direction of the lens barrel support member 620. As described below, coils 83 of the swinging magnetic-drive mechanism 80 are fixed to the respective wall parts 642 to 645. The lens barrel holder 640 also includes a cylindrical part 646 which extends to the side "+Z" in the "Z"-axis direction from an edge of a circular through hole formed on the center of the lens barrel holder body part 641. As illustrated in FIG. 2, the lens barrel support member 620 of the optical module 60 is disposed on the inner side of the cylindrical part 646 of the lens barrel holder 640. The lens barrel holder body part 641 is in contact with the sensor housing part 622 of the optical module 60.

(Gimbal Mechanism)

The gimbal mechanism 70 is disposed between the lens barrel holder 640 and the holder body part 510. The gimbal mechanism 70 includes two first swing support parts 710 which are diagonally disposed on a first axial line "R1" on the lens barrel holder 640, two second swing support parts 720 which are diagonally disposed on a second axial line "R2" on the holder body part 510, and a movable frame 730 which is supported by the first swing support parts 710 and the second swing support parts 720. The first axial line "R1" and the second axial line "R2" are perpendicular to the optical axis direction "L" and inclined by 45° relative to the "X"-axis direction and the "Y"-axis direction. Thus, the first swing support parts 710 and the second swing support parts 720 are disposed at angular positions (third direction) between the "X"-axis direction (first direction) and the "Y"-axis direction (second direction). As illustrated in FIG. 5B, each of the second swing support parts 720 is a recess formed on an inner side face of the holder body part 510.

The movable frame 730 is a plate-shaped spring which has a substantially octagonal plane shape when viewed in the optical axis direction "L". Balls 731 made of metal are fixed to an outer side face of the movable frame 730 at four positions around the optical axis by, for example, welding. The balls 731 come into point contact with contact springs 740 which are held by the first swing support parts 710 disposed on the lens barrel holder 640 and the second swing support parts 720 disposed on the holder body part 510. The contact springs 740 are plate-shaped springs. The contact springs 740 held by the first swing support parts 710 are elastically deformable in the first axial line "R1" direction. The contact springs 740 held by the second swing support parts 720 are elastically deformable in the second axial line "R2" direction. Accordingly, the movable frame 730 is rotatably supported around each of the two directions (the first axial line "R1" direction and the second axial line "R2" direction) perpendicular to the optical axis direction "L".

(Swinging Magnetic-Drive Mechanism)

Figure 6:
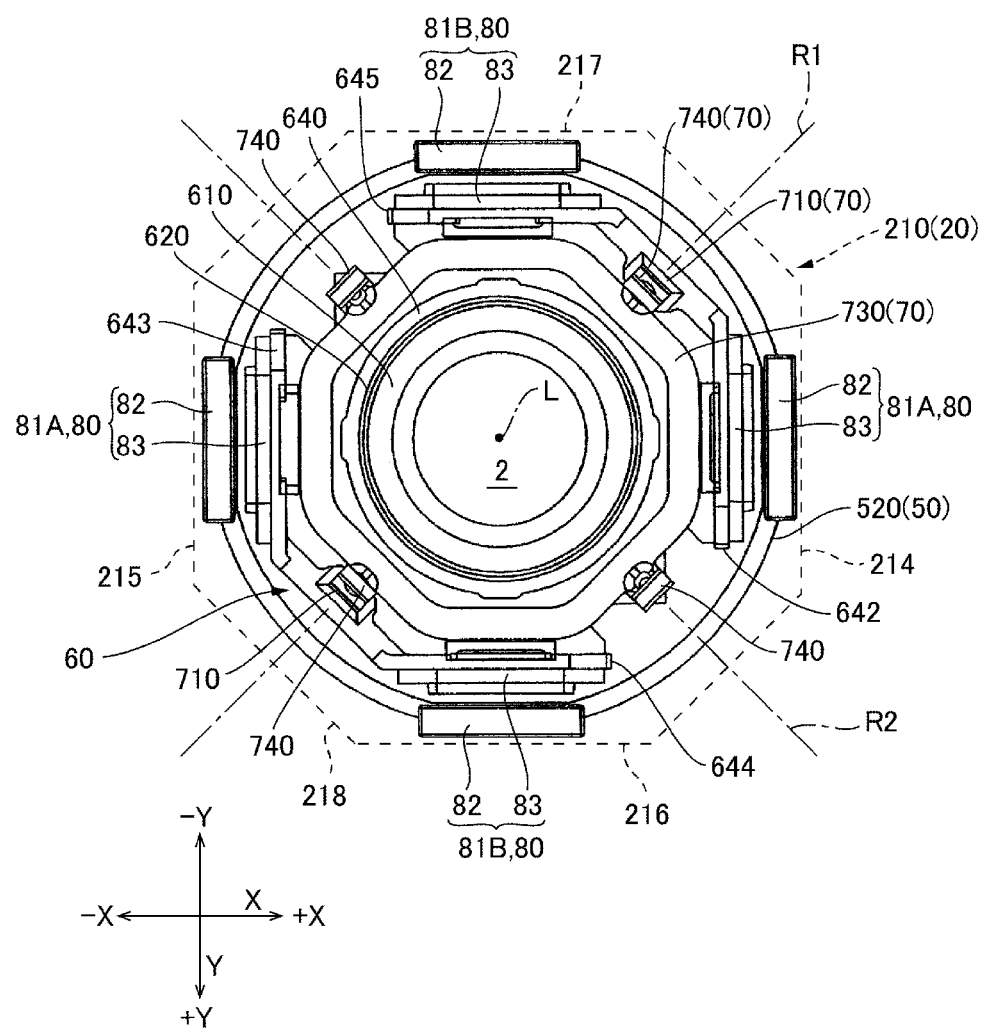
FIG. 6 is a plan view of the movable body with the rotary bearing holder and a spring member detached and magnets of a swinging magnetic-drive mechanism which are viewed from the subject side.

FIG. 6 is a plan view of the movable body 10 with the rotary bearing holder 50 and the spring member 90 detached and magnets 82 of the swinging magnetic-drive mechanism 80 which are viewed from the subject side (the side "+Z" in the "Z"-axis direction). In FIG. 6, an inner face of the tubular case 210 of the fixed body 20 is indicated by a broken line. As illustrated in FIG. 6, the swinging magnetic-drive mechanism 80 includes first magnetic-drive mechanisms 81A and second magnetic-drive mechanisms 81B which are disposed between the optical module 60 and the fixed body 20. Each of the first magnetic-drive mechanisms 81A includes a magnet 82 and a coil 83. Each of the second magnetic-drive mechanisms 81B includes a magnet 82 and a coil 83. As illustrated in FIG. 5A, the coils 83 are held on outer side faces of the wall parts 642, 643 on the opposite sides in the "X"-axis direction and the wall parts 644, 645 on the opposite sides in the "Y"-axis direction of the lens barrel holder 640. As illustrated in FIGS. 2 to 4, and 6, the magnets 82 are held on inner side faces of the side plates 214, 215, 216, 217 formed on the tubular case 210 of the fixed body 20. The tubular case 210 is made of a magnetic material and functions as a yoke for the magnets 82.

As illustrated in FIG. 6, the magnets 82 face the respective coils 83 on all of the side "+X" in the "X"-axis direction, the side "−X" in the "X"-axis direction, the side "+Y" in the "Y"-axis direction, and the side "−Y" in the "Y"-axis direction between the lens barrel holder 640 and the tubular case 210. The magnets 82 and the coils 83 that face each other on the side "+X" in the "X"-axis direction and the side "−X" in the "X"-axis direction of the lens barrel holder 640 constitute the first magnetic-drive mechanisms 81A. The magnets 82 and the coils 83 that face each other on the side "+Y" in the "Y"-axis direction and the side "−Y" in the "Y"-axis direction of the lens barrel holder 640 constitute the second magnetic-drive mechanisms 81B. Each of the magnets 82 is divided into two magnet pieces in the optical axis direction "L" (i.e., the "Z"-axis direction), and faces on the inner face side of the divided magnet pieces are magnetized in different poles from each other from the divided position (from the magnetized polarization line). Each of the coils 83 is an air-core coil, and long sides on the side "+Z" in the "Z"-axis direction and the side "−Z" in the "Z"-axis direction of each of the coils 83 are utilized as effective sides.

The two second magnetic-drive mechanisms 81B, which are located on the side "+Y" in the "Y"-axis direction and the side "−Y" in the "Y"-axis direction of the lens barrel holder 640, are interconnected to generate magnetic-drive forces around the "X" axis in a single direction when electric current is supplied to the coils 83. Further, the two magnetic-drive mechanisms 81A, which are located on the side "+X" in the "X"-axis direction and the side "−X" in the "X"-axis direction of the lens barrel holder 640, are interconnected to generate magnetic-drive forces around the "Y" axis in a single direction when electric current is supplied to the coils 83. The swinging magnetic-drive mechanism 80 rotates the optical module 60 around the first axial line "R1" and the second axial line "R2" by combining the rotation around the "X" axis caused by the second magnetic-dive mechanisms 81B and the rotation around the "Y" axis caused by the first magnetic-drive mechanisms 81A. In correcting a shake around the "X" axis and a shake around the "Y" axis, the rotation around the first axial line "R1" and the rotation around the second axial line "R2" are combined.

The lens barrel 610 of the optical module 60 protrudes to the subject side (the side "+Z" in the "Z"-axis direction) relative to the swinging magnetic-drive mechanism 80 disposed between the lens barrel holder 640 and the tubular case 210. The bearing fixing part 530 disposed on the holder body part 510 of the rotary bearing holder 50 is configured to surround the outer peripheral side of the lens barrel 610 which protrudes to the subject side (the side "+Z" in the "Z"-axis direction). That is, a tip part on the subject side (the side "+Z" in the "Z"-axis direction) of the lens barrel 610 is protected by the rotary bearing holder 50.

(Spring Member)

As illustrated in FIGS. 2, 5A and 5B, the spring member 90 connects the optical module 60 and the holder body part 510 to each other through the lens barrel holder 640. The spring member 90 holds postures of the lens barrel holder 640 and the optical module 60 which are in a stationary state in which the swinging magnetic-drive mechanism 80 is not driven. As illustrated in FIG. 5A, the spring member 90 is a plate spring made by forming a metal plate in a rectangular frame shape. The spring member 90 includes fixed body-side connecting parts 91 which are formed on its outer peripheral part. The fixed body-side connecting parts 91 are fixed to respective spring attachment parts 514 (refer to FIG. 5B) each of which protrudes to the lower side from an inner face of the holder body part 510. The spring member 90 also includes a movable body-side connecting part 92 which is formed on its inner peripheral part. The movable body-side connecting part 92 is fixed to an end face on the subject side (the side "+Z" in the "Z"-axis direction) of the cylindrical part 646 of the lens barrel holder 640. The fixed body-side connecting parts 91 are coupled to the movable body-side connecting part 92 via arm parts 93. The spring member 90 is fixed to the cylindrical part 646 through an adhesive layer which is formed on the end face on the subject side of the cylindrical part 646. Thus, when the spring member 90 is in a fixed state, the spring member 90 is separated from the end face on the subject side of the cylindrical part 646 to the side "+Z" in the "Z"-axis direction.

(Rolling Magnetic-Drive Mechanism)

Figure 7:
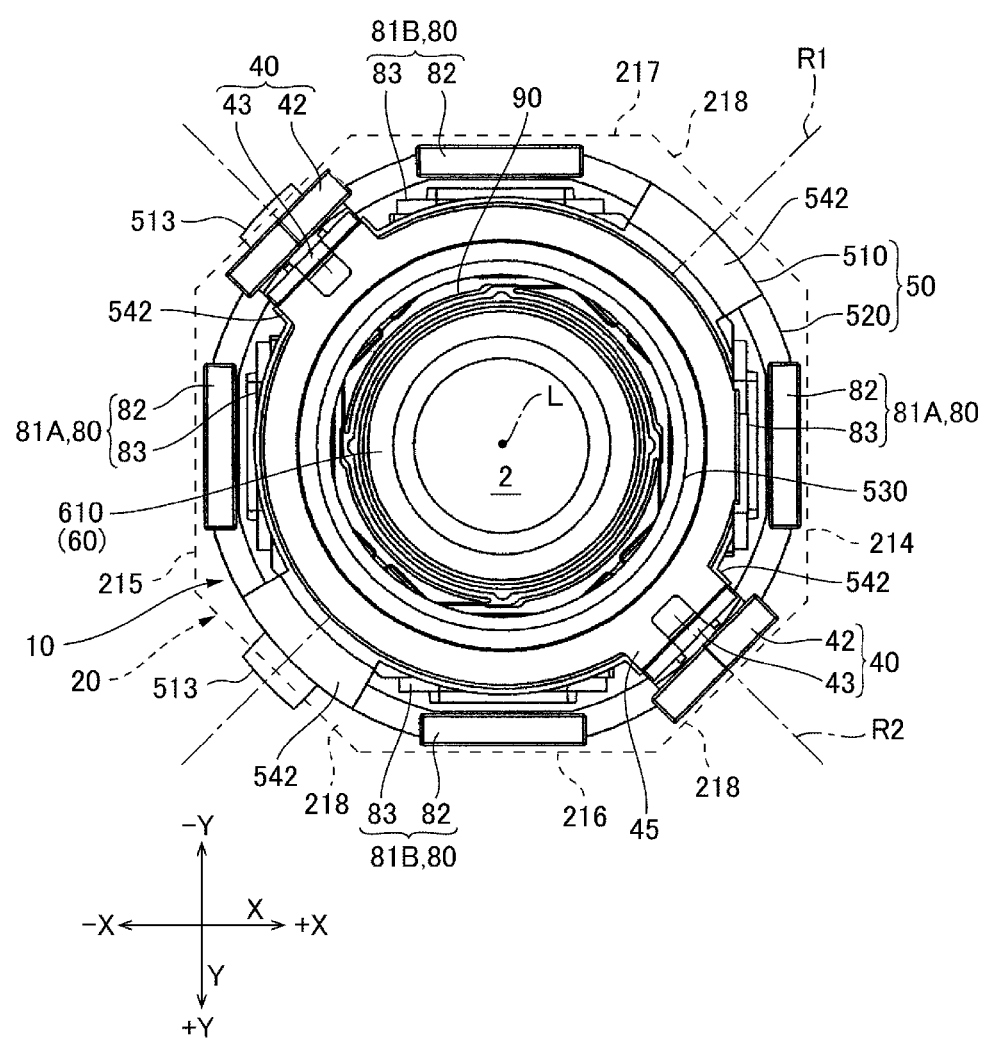
FIG. 7 is a plan view of the movable body and magnets which are viewed from the subject side.

FIG. 7 is a plan view of the movable body 10, the magnets 82, and magnets 42 which are viewed from the subject side (the side "+Z" in the "Z"-axis direction). In FIG. 7, the inner face of the tubular case 210 of the fixed body 20 is indicated by a broken line. As illustrated in FIG. 7, the rolling magnetic-drive mechanism 40 includes two magnetic-drive mechanisms 41 which are disposed between the movable body 10 and the fixed body 20. Each of the magnetic-drive mechanisms 41 includes a magnet 42 and a coil 43. As illustrated in FIGS. 3 to 5B, the coils 43 are fixed to the respective coil fixing parts 543 which are formed on the vertical frame parts 542 of the rotary bearing holder 50. A flexible circuit board 45 for power supply to the coils 43 is disposed on an annular face 544 (refer to FIGS. 2 and 5A) which is formed between the bearing fixing part 530 and the holder body part 540 and led around to the coil fixing parts 543.

As illustrated in FIGS. 2, 3, and 7, the magnets 42 are fixed to inner side faces of respective two of the four side plates 218 formed on the tubular case 210 of the fixed body 20, the two side plates 218 being located at angular positions where the coil fixing parts 543 are located. Each of the coil fixing parts 543 is located in a direction (third direction) inclined by 45° relative to the "X"-axis direction (first direction) and the "Y"-axis direction (second direction). Thus, the two magnetic-drive mechanisms 41 included in the rolling magnetic-drive mechanism 40 are located in the direction (third direction) between the "X"-axis direction (first direction) and the "Y"-axis direction (second direction). In this embodiment, the third direction coincides with the second axial line "R2" direction of the gimbal mechanism 70.

(Shake Correction of Optical Unit)

As described above, the optical unit 1 includes the swinging magnetic-drive mechanism 80 which corrects a shake around the "X" axis and a shake around the "Y" axis. Thus, it is possible to correct a shake in a pitching (vertical shake) direction and a shake in a yawing (horizontal shake) direction. The optical unit 1 also includes the rolling magnetic-drive mechanism 40. Thus, it is possible to correct a shake in a rolling direction. Further, in the optical unit 1, the optical module 60 includes the gyroscope 632. Thus, the optical unit 1 detects shakes around the three axes perpendicular to each other using the gyroscope 632 and drives the swinging magnetic-drive mechanism 80 and the rolling magnetic-drive mechanism 40 so as to cancel the detected shakes.

Magnetic sensors 44 (refer to FIG. 5A) are disposed at positions facing the magnetized polarization lines of the magnets 42 included in the magnetic-drive mechanisms 41 of the rolling magnetic-drive mechanism 40. Each of the magnetic sensors 44 is disposed on the center of the coil 43 and fixed to the coil fixing part 543 of the rotary bearing holder 50. The rolling magnetic-drive mechanism 40 is controlled on the basis of an original position in the rolling direction detected on the basis of signals from the magnetic sensors 44 and rotates the optical module 60 around the optical axis to correct a shake in the rolling direction.

(Stopper Mechanism)

The holder body part 510 of the rotary bearing holder 50 includes protrusions 513 each of which has a rectangular shape and protrudes to the outer peripheral side. The protrusions 513 are formed on an end part on the image side (the side "−Z" in the "Z"-axis direction) of the holder body part 510 at angular positions corresponding to the respective cut-out parts 219 formed on the tubular case 210 of the fixed body 20. When the movable body 10 is assembled to the inner side of the fixed body 20, the protrusions 513 are fitted with the respective cut-out parts 219 as illustrated in FIG. 1. A width in the circumferential direction of the cut-out part 219 is larger than a width in the circumferential direction of the protrusion 513. Thus, an angular range of a relative rotation of the rotary bearing holder 50 to the tubular case 210 around the optical axis is restricted by contact of the protrusions 513 with an inner peripheral edge of the rotary bearing holder 50. That is, the cut-out parts 219 function as the restriction part which restricts the rotation of the movable body 10 provided with the rotary bearing holder 50 around the optical axis. The protrusions 513 and the cut-out parts 219 constitute a stopper mechanism for restricting the rotation of the movable body 10 around the optical axis. In this embodiment, a rotation range of the movable body 10 restricted by the stopper mechanism is set to ±6°.

(Principal Functional Effects in this Embodiment)

As described above, in the optical unit 1 of this embodiment, the movable body 10 provided with the optical module 60 is rotatably supported around the optical axis by the subject-side rotary bearing part 310 and the image-side rotary bearing part 320. It is possible to restrain the tilt of the optical module 60 and backlash during the rotation of the optical module 60 around the optical axis by disposing the two rotary bearing parts on both the subject side and the image side of the optical module 60 in this manner. When only one rotary bearing part is provided, the optical module 60 becomes a cantilever state. Accordingly, a twisting load is applied to the rotary bearing part due to an impact. The rotary bearing part is weak against such a load and may thus be broken due to the impact. In this embodiment, the two rotary bearing parts (the subject-side rotary bearing part 310 and the image-side rotary bearing part 320) support the optical module 60, which prevents the optical module 60 from becoming a cantilever state. Thus, there is no force in a twisting direction. Therefore, it is possible to reduce the possibility of breakage of the rotary bearing parts due to an impact by reducing the tilt of the optical module 60.

In this embodiment, the movable body 10, which rotates around the optical axis, includes the rotary bearing holder 50 which swingably supports the optical module 60 through the swinging magnetic-drive mechanism 80. The subject-side rotary bearing part 310 and the image-side rotary bearing part 320 are fixed to the rotary bearing holder 50. The coils 43 included in the rolling magnetic-drive mechanism 40 are also fixed to the rotary bearing holder 50. Thus, there is a low possibility of changes in the positions of the coils 43 fixed to the rotary bearing holder 50 because of the restriction of the tilt of the rotary bearing holder 50. Therefore, there is a low possibility of a change in the positional relationship between the magnets 42 fixed to the fixed body 20 and the coils 43. Further, the optical module 60 swings with respect to the rotary bearing holder 50, and the rotary bearing holder 50 rolls with respect to the fixed body 20. Thus, even when the optical module 60 swings, there is no change in the relative position between the rotary bearing holder 50 and the fixed body 20. Therefore, it is possible to reduce a change in a drive force of the rolling magnetic-drive mechanism 40.

In this embodiment, the magnets 42 of the rolling magnetic-drive mechanism 40 are fixed to the fixed body 20, whereas the coils 43 of the rolling magnetic-drive mechanism 40 are fixed to the rotary bearing holder 50. In this manner, the weight of the movable body 10 can be reduced by fixing either the coils 43 or the magnets 42, whichever the lighter one, to the movable body 10 which rotates around the optical axis. Thus, it is possible to reduce a required drive force of the rolling magnetic-drive mechanism 40. As a result, it is possible to downsize the rolling magnetic-drive mechanism 40.

The rotary bearing holder 50 of this embodiment includes the holder body part 510 on which the image-side opening 511, which is open on the image side (the side "−Z" in the "Z"-axis direction) of the optical module 60, is formed. The shaft 550, which is rotatably supported by the image-side rotary bearing part 320, is disposed on the bottom plate 520 fixed to the image-side opening 511. Further, the rear case 230 of the fixed body 20 is engaged with the flange 325 of the image-side rotary bearing part 320 from the side "−Z" in the "Z"-axis direction to bias the image-side rotary bearing part 320 toward the bottom plate 520. With such a structure, the bottom plate 520 and the image-side rotary bearing part 320 can be attached from the image side (imaging element side) of the optical module 60 assembled to the holder body part 510 of the rotary bearing holder 50. This results in an easy assembling operation of the image-side rotary bearing part 320. Further, when a ball bearing is used as the image-side rotary bearing part 320, it is possible to apply a pressure to the ball bearing by biasing the flange 325 toward the bottom plate 520 by the rear case 230. Accordingly, gaps between the balls 323 of the ball bearing and the inner ring 322 and between the balls 323 and the outer ring 321 can be eliminated. Thus, it is possible to reduce backlash during rotation. The structure for biasing the outer ring 321 of the image-side rotary bearing part 320 toward the bottom plate 520 by the rear case 230 may not be the structure that engages the flange 325 formed on the outer ring 321 with the inner peripheral edge of the circular opening 232. For example, another engagement structure may be disposed between the inner peripheral edge of the circular opening 232 and the outer ring 321. Alternatively, an end face on the side "−Z" in the "Z"-axis direction of the outer ring 321 may be fixed to the end plate part 231 of the rear case 230.

In this embodiment, the movable body 10, which rotates around the optical axis, includes the swinging magnetic-drive mechanism 80. The swinging magnetic-drive mechanism 80 includes the first magnetic-drive mechanisms 81A disposed on the opposite sides in the "X"-axis direction (first direction) with respect to the optical module 60 and the second magnetic-drive mechanisms 81B disposed on the opposite sides in the "Y"-axis direction (second direction) with respect to the optical module 60. Further, the rolling magnetic-drive mechanisms 40 are disposed on the opposite sides in the direction (the third direction: the second axial line "R2" direction) inclined by 45° relative to the "X"-axis direction (first direction) and the "Y"-axis direction (second direction). Thus, the rolling magnetic-drive mechanism 40 can be disposed using spaces between the first magnetic-drive mechanisms 81A and the second magnetic-drive mechanisms 81B of the swinging magnetic-drive mechanism 80. Therefore, it is possible to downsize the optical unit 1.

In this embodiment, the subject-side rotary bearing part 310 rotatably supports the optical module 60 through the rotary bearing holder 50. Specifically, the inner ring 312 of the subject-side rotary bearing part 310 is fixed to the rotary bearing holder 50. Further, the rotary bearing holder 50 holds the gimbal mechanism 70, which is a swing support mechanism, and swingably supports the optical module 60 through the gimbal mechanism 70. That is, the rotary bearing holder 50 has both a holding mechanism for holding the ball bearing and a holding mechanism for holding the gimbal mechanism 70. Thus, it is possible to simplify the structure of the optical unit 1 and reduce the number of components.

The gimbal mechanism 70 of this embodiment is a structure that supports the movable frame 730 using the first swing support parts 710 and the second swing support parts 720. The first swing support parts 710 and the second swing support parts 720 are disposed on the first axial line "R1" and the second axial line "R2", which are angular positions between the "X"-axis direction and the "Y"-axis direction. Thus, the gimbal mechanism 70 can be disposed using the spaces between the first magnetic-drive mechanisms 81A and the second magnetic-drive mechanisms 81B of the swinging magnetic-drive mechanism 80. Therefore, it is possible to downsize the optical unit 1.

In this embodiment, the protrusions 513 are formed on the outer peripheral face of the rotary bearing holder 50. Further, the fixed body 20 includes the cut-out parts 219 which function as the restriction part which restricts the movement range in the circumferential direction of the protrusions 513. Thus, the rotary bearing holder 50 and the fixed body 20 can constitute the stopper mechanism for restricting the rotation range in the rolling direction of the movable body 10.

In this embodiment, the coils 83 included in the swinging magnetic-drive mechanism 80 are fixed to the lens barrel holder 640 which holds the lens barrel 610 of the optical module 60. Thus, components to which current is supplied can be integrated to the optical module 60, so that wiring lines for current supply can be integrated. Note that the coils 83 can also be integrated into one component by using, for example, a printed coil.

In this embodiment, the lens barrel 610 of the optical module 60 protrudes to the subject side (the side "+Z" in the "Z"-axis direction) relative to the swinging magnetic-drive mechanism 80. The rotary bearing holder 50 includes the bearing fixing part 530 which surrounds the outer peripheral side of the end part on the subject side of the lens barrel 610. This enables the rotary bearing holder 50 to have both a protection function for protecting the lens barrel 610 and a holding function for holding the subject-side rotary bearing part 310.

In this embodiment, the magnetic sensors 44 are disposed at the positions facing the magnetized polarization lines of the magnets 42 included in the rolling magnetic-drive mechanism 40. The rolling magnetic-drive mechanism 40 is controlled on the basis of the original position in the rolling direction detected on the basis of output of the magnetic sensors 44. Thus, a spring for a return to the original position is not required. Further, differently from a configuration that performs the return to the original position using a spring, it is possible to eliminate a swing return during the return to the original position. Further, it is also possible to control the rolling magnetic-drive mechanism 40 by detecting a drive direction.

Modified Embodiments (1) In the rolling magnetic-drive mechanism 40 of the embodiment described above, the two magnetic-drive mechanisms 41 are disposed on the opposite sides across the movable body 10. However, only one magnetic-drive mechanism 41 may be provided. Further, three or more magnetic-drive mechanisms 41 may be provided.

(2) In the swinging magnetic-drive mechanism 80, the two first magnetic-drive mechanisms 81A are disposed on the opposite sides across the optical module 60, and the two second magnetic-drive mechanisms 81B are disposed on the opposite sides across the optical module 60. However, one first magnetic-drive mechanism 81A and one second magnetic-drive mechanism 81B may be provided.

(3) The magnets 42 and the coils 43 included in the rolling magnetic-drive mechanism 40 may be disposed in a reverse manner. Further, the magnets 82 and the coils 83 included in the first magnetic-drive mechanisms 81A and the second magnetic-drive mechanisms 81B of the swinging magnetic-drive mechanism 80 may be disposed in a reverse manner.

(4) Although the rolling support mechanism 30 of the embodiment described above is a ball bearing, a rotary bearing part other than a ball bearing may be used. For example, a sliding bearing may be used as either one or both of the subject-side rotary bearing part 310 and the image-side rotary bearing part 320. The sliding bearing may be a metal-containing bearing or a resin bearing member with fluorine-coated surface. It is possible to achieve weight reduction and cost reduction by using the sliding bearing.

(5) In the embodiment described above, the magnetic sensors 44 detect the original position in the rolling direction. However, a spring member for a return to the original position may be disposed between the rotary bearing holder 50 and the fixed body 20 without using the magnetic sensors 44.

Another Embodiment

Figure 8A:
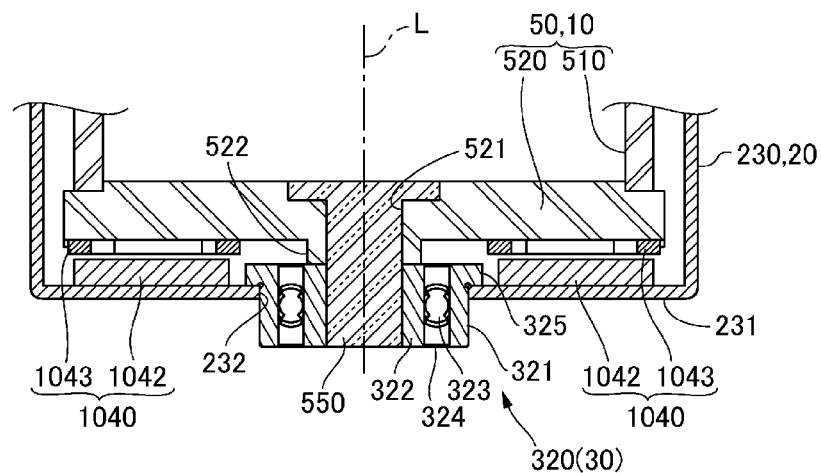
FIGS. 8A and 8B are a sectional view and a plan view of rolling magnetic-drive mechanisms and an image-side rotary bearing part of another embodiment, respectively.
Figure 8B:
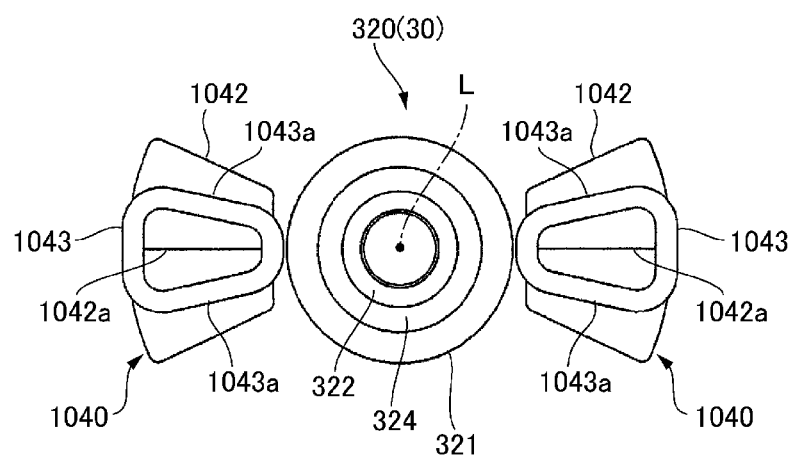

FIGS. 8A and 8B are a sectional view and a plan view of rolling magnetic-drive mechanisms 1040 and an image-side rotary bearing part 320 of another embodiment, respectively. FIG. 8A is a sectional view of the rolling magnetic-drive mechanisms 1040 and the image-side bearing part 320. FIG. 8B is a plan view from the subject side (the side "+Z" in the "Z"-axis direction). In the rolling magnetic-drive mechanism 40 of the embodiment described above, each of the magnetic-drive mechanisms 41 is disposed on the outer peripheral side of the optical module 60, and the magnet 42 and the coil 43 face each other in the radial direction of the optical module 60. However, the rolling magnetic-drive mechanism 40 may be disposed at another position. Each of the rolling magnetic-drive mechanism 1040 of this embodiment includes a magnet 1042 and a coil 1043 which face each other in the optical axis direction "L". The image-side rotary bearing part 320 is a ball bearing and has the same configuration as the above embodiment. Thus, description for the image-side rotary bearing part 320 will be omitted. Note that a sliding bearing may be used instead of the ball bearing as the image-side rotary bearing part 320.

As illustrated in FIG. 8A, each of the magnets 1042 is fixed to the subject side (the side "+Z" in the "Z"-axis direction) of an end plate part 231 of a rear case 230 included in a fixed body 20. Each of the coils 1043 is fixed to the image side (the side "−Z" in the "Z"-axis direction) of a bottom plate 520 of a rotary bearing holder 50. Thus, the magnet 1042 and the coil 1043 face each other in the optical axis direction "L". As illustrated in FIG. 8B, each of the coils 1043 is a fan-shaped air-core coil centered on the optical axis, and includes two effective sides 1043a which extend in the radial direction at positions separated from each other in the circumferential direction. When the direction of the effective sides 1043a coincides with the radial direction, it is possible to reduce the generation of a drive force that is unnecessary for the rotation around the optical axis. Each of the magnets 1042 has a fan shape centered on the optical axis. The magnet 1042 is divided into two magnet pieces in the circumferential direction, and faces of the divided magnet pieces that face the coil 1043 are magnetized in different poles from each other from the divided position (from a magnetized polarization line 1042a). The magnetized polarization line 1042a is located at the midpoint between the two effective sides 1043a.

The rolling magnetic-drive mechanisms 1040 of this embodiment are disposed between the bottom plate 520 of the rotary bearing holder 50 and the end plate part 231 of the rear case 230 using a free space present on the outer peripheral side of the image-side rotary bearing part 320. Thus, it is possible to downsize the optical unit 1.

While the description above refers to particular embodiments of the present invention, it will be understood that many modifications may be made without departing from the spirit thereof. The accompanying claims are intended to cover such modifications as would fall within the true scope and spirit of the present invention.

The precisely disclosed embodiments are therefore to be considered in all respects as illustrative and not restrictive, the scope of the invention being indicated by the appended claims, rather than the foregoing description, and all changes which come within the meaning and range of equivalency of the claims are therefore intended to be embraced therein.

What is claimed is:

1. An optical unit comprising:
an optical module comprising an optical element;
a swinging magnetic-drive mechanism structured to swing the optical module around an axis intersecting an optical axis;
a rolling support mechanism structured to rotatably support the optical module around the optical axis;
a fixed body structured to support the rolling support mechanism; and
a rolling magnetic-drive mechanism structured to rotate the optical module around the optical axis,
wherein
the rolling support mechanism comprises a subject-side rotary bearing part disposed on a subject side of the optical module and an image-side rotary bearing part disposed on an image side of the optical module.

2. The optical unit according to claim 1, further comprising
a rotary bearing holder structured to swingably support the optical module through the swinging magnetic-drive mechanism,
wherein
the subject-side rotary bearing part and the image-side rotary bearing part are fixed to the rotary bearing holder, and
either a magnet or a coil, the magnet and the coil being included in the rolling magnetic-drive mechanism, is fixed to the rotary bearing holder, and an other one is fixed to the fixed body.

3. The optical unit according to claim 2, wherein
the magnet is fixed to the fixed body, and the coil is fixed to the rotary bearing holder.

4. The optical unit according to claim 3, wherein
the rotary bearing holder comprises a holder body part comprising an image-side opening open on the image side of the optical module and a bottom plate fixed to the image-side opening,
a shaft rotatably supported by the image-side rotary bearing part is disposed on the bottom plate, and
the fixed body comprises a case that biases the image-side rotary bearing part toward the bottom plate.

5. The optical unit according to claim 4, wherein
the image-side rotary bearing part is a ball bearing comprising an outer ring biased toward the bottom plate by the case and an inner ring fixed with the shaft.

6. The optical unit according to claim 2, wherein
the swinging magnetic-drive mechanism comprises a first magnetic-drive mechanism disposed on one side or each side in a first direction intersecting the optical axis with respect to the optical module and a second magnetic-drive mechanism disposed on one side or each side in a second direction intersecting the optical axis and the first direction with respect to the optical module, and
the rolling magnetic-drive mechanism is disposed on one side or each side in a third direction between the first direction and the second direction with respect to the optical module.

7. The optical unit according to claim 2, wherein
the magnet and the coil included in the rolling magnetic-drive mechanism face each other in an optical axis direction.

8. The optical unit according to claim 7, wherein
the coil comprises two effective sides extending in a radial direction around the optical axis at positions separated from each other in a circumferential direction, and
a magnetized polarization line of the magnet is located between the two effective sides.

9. The optical unit according to claim 6, wherein
the subject-side rotary bearing part is a ball bearing comprising an inner ring fixed to the rotary bearing holder and an outer ring fixed to the fixed body, and
the rotary bearing holder holds a swing support mechanism structured to swingably support the optical module.

10. The optical unit according to claim 9, wherein
the swing support mechanism is a gimbal mechanism,
the gimbal mechanism comprises a first swing support part disposed on the optical module, a second swing support part disposed on the rotary bearing holder, and a movable frame supported by the first swing support part and the second support part, and
the first swing support part and the second swing support part are disposed between angles of the first direction and the second direction.

11. The optical unit according to claim 2, wherein
the rotary bearing holder comprises a protrusion formed on an outer peripheral face thereof, and
the fixed body comprises a restriction part structured to restrict a movement range in a circumferential direction of the protrusion.

12. The optical unit according to claim 1, wherein
a coil included in the swinging magnetic-drive mechanism is fixed to the optical module.

13. The optical unit according to claim 1, wherein
the optical module comprises a lens barrel that holds the optical element, and
the subject-side rotary bearing part is located on an outer peripheral side of an end part on a subject side of the lens barrel, the lens barrel being located on the subject side relative to the swinging magnetic-drive mechanism.

14. The optical unit according to claim 1, further comprising
a magnetic sensor located at a position facing a magnetized polarization line of a magnet included in the rolling magnetic-drive mechanism,
wherein
the rolling magnetic-drive mechanism is controlled on a basis of an original position in a rolling direction detected on a basis of an output of the magnetic sensor.

15. The optical unit according to claim 7, wherein
the subject-side rotary bearing part is a ball bearing comprising an inner ring fixed to the rotary bearing holder and an outer ring fixed to the fixed body, and
the rotary bearing holder holds a swing support mechanism that swingably supports the optical module.

16. The optical unit according to claim 15, wherein
the swing support mechanism is a gimbal mechanism,
the gimbal mechanism comprises a first swing support part disposed on the optical module, a second swing support part disposed on the rotary bearing holder, and a movable frame supported by the first swing support part and the second support part, and the first swing support part and the second swing support part are disposed between angles of the first direction and the second direction.

17. The optical unit according to claim 7, wherein
the rotary bearing holder comprises a protrusion formed on an outer peripheral face thereof, and
the fixed body comprises a restriction part structured to restrict a movement range in a circumferential direction of the protrusion.

18. The optical unit according to claim 7, wherein
a coil included in the swinging magnetic-drive mechanism is fixed to the optical module.

19. The optical unit according to claim 7, wherein
the optical module comprises a lens barrel that holds the optical element, and
the subject-side rotary bearing part is located on an outer peripheral side of an end part on a subject side of the lens barrel, the lens barrel being located on the subject side relative to the swinging magnetic-drive mechanism.

20. The optical unit according to claim 7, further comprising
a magnetic sensor located at a position facing a magnetized polarization line of a magnet included in the rolling magnetic-drive mechanism,
wherein
the rolling magnetic-drive mechanism is controlled on a basis of an original position in a rolling direction detected on a basis of an output of the magnetic sensor.

\* \* \* \* \*